March 1, 1966     G. E. SWANSON     3,237,978
FASTENING DEVICE
Filed Oct. 26, 1964     4 Sheets-Sheet 1
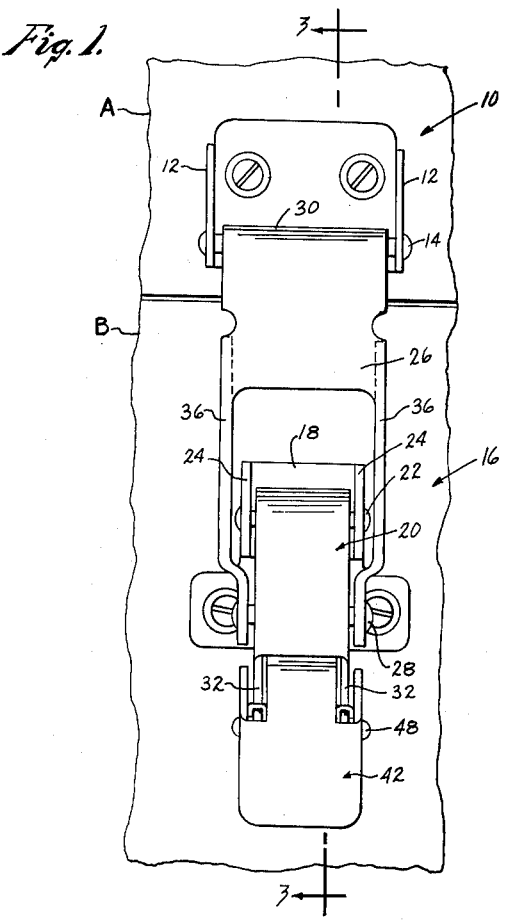
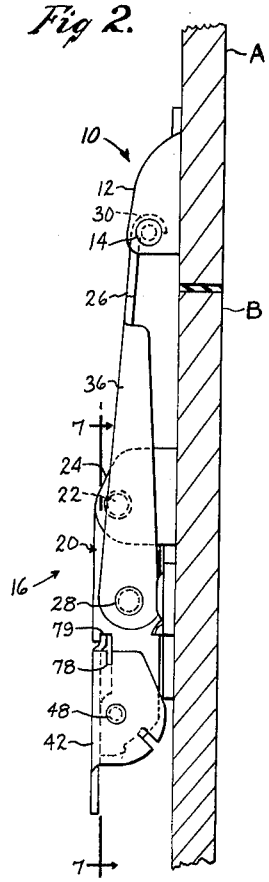
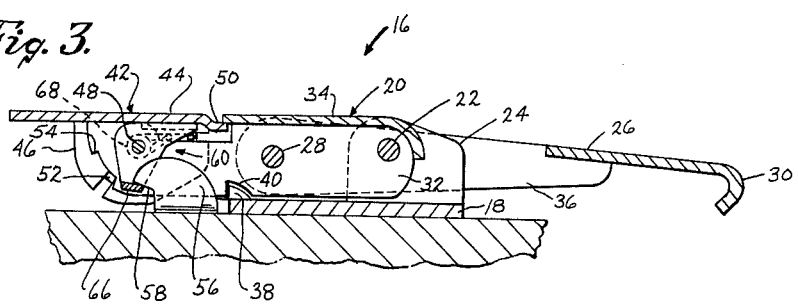
*INVENTOR.*
GUNNAR E. SWANSON
BY McCormick, Paulding & Huber
ATTORNEYS March 1, 1966  G. E. SWANSON  3,237,978
FASTENING DEVICE
Filed Oct. 26, 1964  4 Sheets-Sheet 2

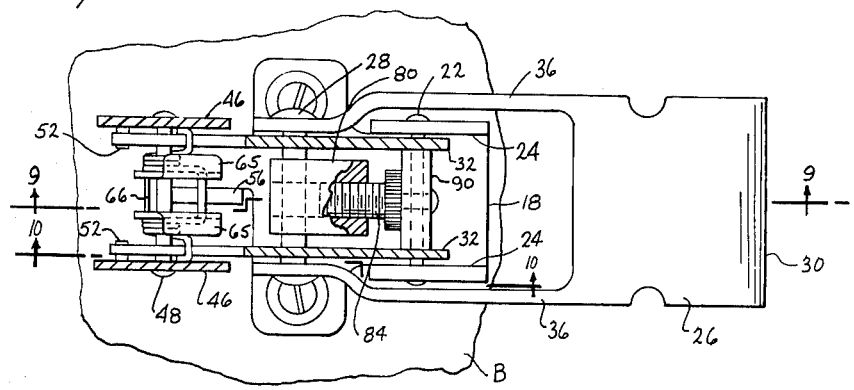
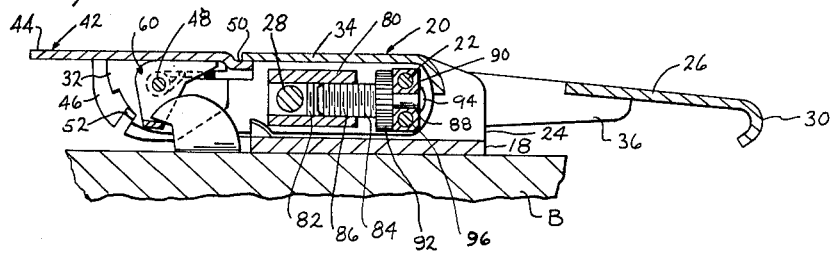
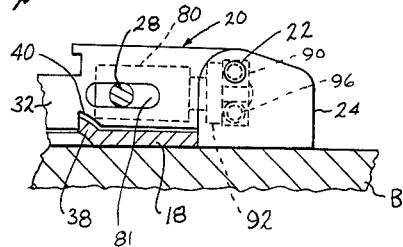

March 1, 1966     G. E. SWANSON     3,237,978
FASTENING DEVICE

Filed Oct. 26, 1964     4 Sheets-Sheet 4

United States Patent Office 3,237,978
Patented Mar. 1, 1966

3,237,978
FASTENING DEVICE
Gunnar E. Swanson, 406 Ridge Road, Middletown, Conn.
Filed Oct. 26, 1964, Ser. No. 406,976
16 Claims. (Cl. 292—113)

This application is a continuation-in-part of my copending application Serial No. 249,195, filed January 3, 1963 on a "Fastening Device" and now abandoned.

This invention relates to a fastening device or catch for releasably joining together two separable panels or parts such as the cover and body of a packing case, and deals more particularly with improvements in a catch of the type including a swinging operating lever, a control lever on the operating level and a lock for holding the operating lever in a closed position against forces applied by accidental shock loads or the like which might otherwise tend to open the latter.

The catch shown and described herein is of the same general type, and constitutes an improvement on, the catch shown in my prior Patent No. 2,951,722, issued September 6, 1960 and entitled "Catch for a Packing Case or the Like."

The object of the present invention is to provide a catch of the general type mentioned above and which is of a simple, more easily manufactured and more economical construction than previously proposed catches of the same type.

Another object of the present invention is to provide a catch of the foregoing character wherein the lock for holding the operating lever in its closed position is moved into and out of locking relationship with an associated part in response to movement of the control lever in such a manner as to normally effect opening or closing of the operating lever. That is, as the control lever is moved in such a direction as to move the operating lever from its closed to its open position the lock is automatically released, without any additional manipulation, to permit such movement of the operating lever. Likewise, as the control device is moved in such a direction as to move the operating lever from its open to its closed position the lock automatically sets or locks, as the operating lever reaches its closed position, without any additional manipulation being required.

A further object of this invention is to provide a catch of the foregoing character including means for adjusting the position occupied by the strike-engaging member when the operating lever is in its closed position with the result that said member may be made to properly engage said strike and exert a desired closing pressure thereon.

Other objects and advantages of the invention will be apparent from the following detailed description and from the drawings forming a part thereof.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a plan view of a fastening device or catch embodying the present invention, the catch being shown attached to two separable panels and in a closed condition.

FIG. 2 is a side elevational view of the catch shown in FIG. 1.

FIG. 3 is a sectional view taken on line 3—3 of FIG. 1, this view being drawn on a slightly enlarged scale and the strike and its associated panel being omitted for clarity.

FIG. 8 is a sectional view generally similar to FIG. 7 but showing a catch construction comprising another embodiment of the present invention.

FIG. 9 is a sectional view taken on the line 9—9 of FIG. 8.

FIG. 10 is a fragmentary sectional view taken on the line 10—10 of FIG. 8.

Figure 4:
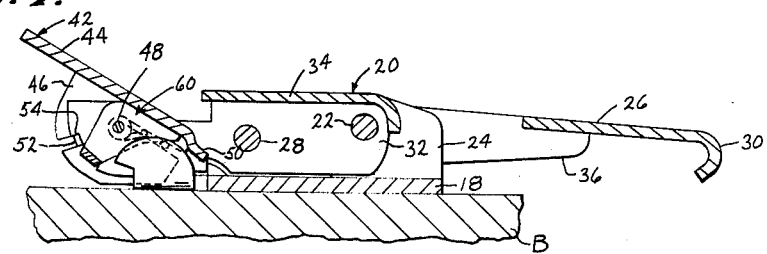
FIG. 4 is view generally similar to FIG. 3, but showing the control lever moved to such position as to effect release of the latch member.
Figure 5:
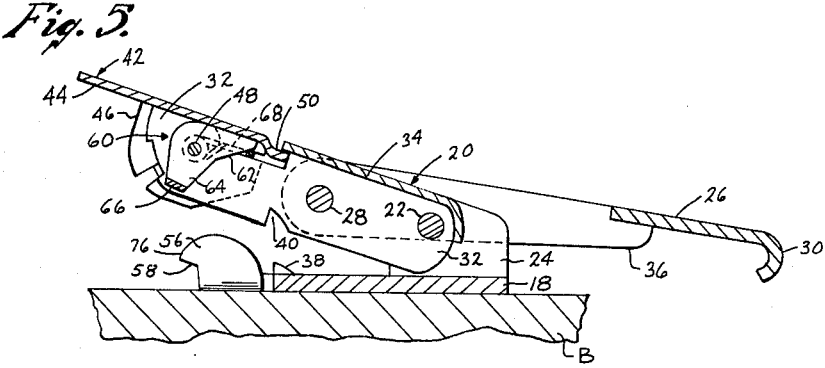
FIG. 5 is a view generally similar to FIG. 3 but with the operating lever being shown displaced some distance from its closed position.

Turning first to FIGS. 1 to 7, a catch embodying the present invention is adapted for use in joining together two separable panels such as shown at A and B in the drawings. The catch includes a strike 10 adapted for fixed attachment to the panel A and includes two laterally spaced side flanges 12, 12 which carry a transversely extending pin 14. The catch also includes a catch unit, indicated generally at 16, which has a base 18 adapted for fixed attachment to the other panel B in alignment with the strike 10. An operating lever 20 is pivotally connected with the base 18 for movement about a transverse pivot axis which is fixed relative to the base, such pivot axis being provided by a pivot pin 22 carried by and extending between two laterally spaced flanges 24, 24 provided on the forward portion of the base. A yoke or hook member 26 is pivotally connected with the operating lever 20 for movement about a transverse pivot axis fixed relative to the operating lever, such pivot axis being provided by a pivot pin 28. At its forward end the yoke 26 is shaped to define a hooked portion 30 which is engageable with the transverse pin 14 of the strike for the purpose of exerting a closing pressure on the strike to hold the panel A to the panel B. The arrangement of the pivot pins 22 and 28 and of the strike pin 14 is such that when the operating lever is in the closed position shown in FIGS. 1, 2 and 3 the pin 22 is located overcenter relative to the pins 22 and 14 and therefore the operating lever 20 is held closed by the closing pressure through the overcenter action. The operating lever 20 is also movable upwardly away from the base 18 (or clockwise in FIGS. 2 and 3) from the closed position shown in FIGS. 1, 2 and 3 to an open position where at the hook portion 30 of the yoke 26 is moved forwardly and free of the strike pin 14, releasing the closing pressure and allowing the yoke to be swung away from the strike so that the panel A may be moved from the panel B. In FIG. 5 the operating lever is shown moved part way toward the open position.

As mentioned, the base 18 has two laterally spaced side flanges 24, 24 which support the pivot pin 22. The operating lever 20 is located between these flanges 24, 24 and includes two longitudinally extending side flanges 32, 32 and a top portion 34. The side flanges 32, 32 extend downwardly toward the base 18 from the top portion 34 and at their forward ends are apertured to pivotally receive the pivot pin 22. The said side flanges of the operating lever are also apertured to receive the pivot pin 28 and the yoke 26 includes two rearwardly extending side flanges or arms 36, 36 which as shown are apertured at their rear ends to receive the pivot pin 28. In order to relieve part of the stress on the pivot pin 22 when the catch is in its closed condition, the base 18 is provided with two upwardly extending protrusions such as shown at 38 and each side flange 32 of the operating lever is provided with a notch 40 the rear wall of which engages the associated protrusion 38 when the catch is in its closed condition.

To aid in moving the operating lever 20 between its opened and closed positions, the catch unit 16 also includes a control lever 42 pivotally connected with the rear end portion of the operating lever. This control lever includes a top portion 44 which extends rearwardly beyond the operating lever to form a tab which is easily grasped and manipulated by a user. The control lever is limited in its pivotal movement relative to the operating lever and is biased to a first or normal position relative to the operating lever, as shown in FIGS. 1, 2 and 3, whereat the top portion 44 is generally aligned with the operating lever so as to be disposed relatively close to the panel B when the operating lever is in its closed position. The control lever is, however, pivotally movable to a second or tipped position relative to the operating lever, as shown in FIG. 4, whereat the rear of the top portion 44 is displaced from the panel B and more conveniently grasped by a user.

Considering the construction of the control lever 42 in more detail, it includes two side flanges 46, 46 which extend downwardly toward the base 18 from the top portion 44, each of said flanges 46, 46 being located closely adjacent to one of the operating lever side flanges 32, 32, and the control lever is in turn pivotally connected to the operating lever by a pivot pin 48 which extends transversely between the operating lever and control lever side flanges and is received in suitable apertures therein. At its forward end the top portion of the control lever is offset downwardly to form a tongue 50 which engages the undersurface of the top portion 34 of the operating lever. Engagement of the tongue 50 with the top portion 34 as shown in FIG. 3 limits counterclockwise movement of the control lever. Movement of the control lever in the opposite or clockwise direction relative to the operating lever is limited by two tabs 52, 52 each of which is cut and bent inwardly from a corresponding one of the control lever side flanges 46, 46. Each tab 52 overlies the rear end of the associated operating lever side flange which has a stop surface 54 engageable with the tab 52 to limit the clockwise movement of the control lever to the position shown in FIG. 4. After the control lever is moved to the FIG. 4 position by a user, continued lifting force applied to the control lever is transferred to the operating lever to move the same from its closed position.

In accordance with the invention, the catch unit as above described also includes a locking means for holding the operating lever in its closed position against the force of accidental shock loads or the like which would otherwise be sufficient to move the operating lever to its open position. This locking means includes a fixed abutment on the base 18 having a surface facing generally downwardly or opposite to the direction of movement of the operating lever in moving from its opened to its closed position, and a latch member which is normally engageable with such abutment surface to hold the operating lever against movement to its open position and which latch member is pivoted out of engagement with the abutment surface as the control lever is moved from its FIG. 3 to its FIG. 4 position. In the illustrated case, the fixed abutment on the base 18 is indicated at 56 and comprises a part bent upwardly from the general plane of the base and located approximately midway between the operating lever side flanges 32, 32. The downwardly facing surface on this abutment is shown at 58.

The latch member is indicated generally at 60 and is pivotally received on the pivot pin 48 for pivotal movement relative to the operating lever about the same transverse axis as the control lever 42. Included in the latch member 60 are two laterally spaced wings located on opposite sides of the abutment 56 and each of which wings is generally L-shaped to define one arm 62 extending generally forwardly of the pivot pin 48 and another arm 68 extending generally downwardly of the pivot pin 48. As shown best in FIGS. 3 and 7, the two forwardly extending arms 62, 62 normally engage the undersurface of the top portion 44 of the control lever, and in order to provide a better seat for the latch member against the control lever each arm 62 also preferably includes a laterally outwardly extending pad 65. Extending laterally between the lower ends of the downwardly extending arms 64, 64 is a part 56 which overlaps, or is located beneath, the abutment surface 58 when the parts of the catch unit are in their normal closed position as shown in FIG. 3.

Figure 6:
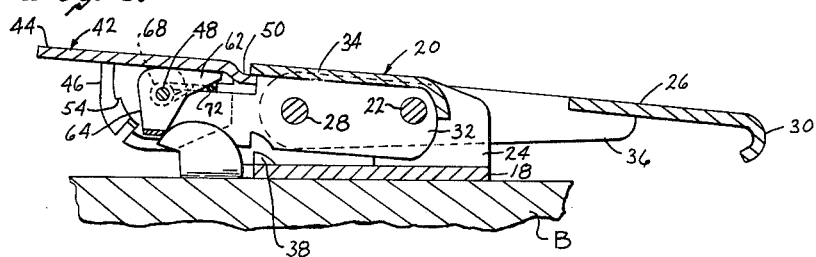
FIG. 6 is a view generally similar to FIG. 5 but showing the operating lever closer to its closed position.
Figure 7:
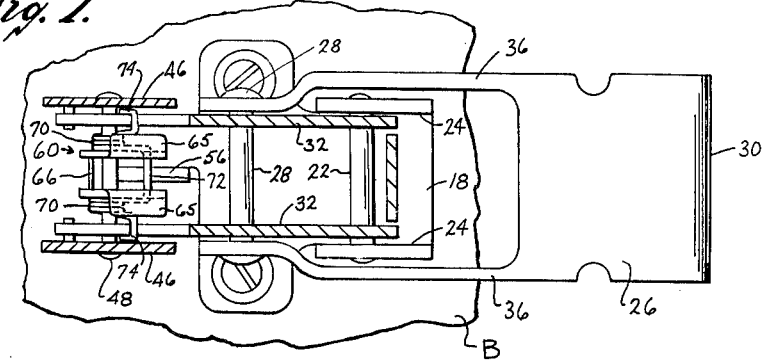
FIG. 7 is a sectional view taken on the line 7—7 of FIG. 2 and drawn on the same scale as FIGS. 3 to 6.

The arms 62, 62 of the latch member are urged toward the top portion of the control lever, or in the counterclockwise as viewed in FIG. 3, by a biasing means which in the present case comprises a torsion spring 68. The latter spring includes two helically wound portions 70, 70 each located between one wing of the latch member and the adjacent side flange of the operating lever. The two helical portions are in turn connected by a U-shaped torque 72 which engages the lower edges of the forwardly extending arms 62, 62. On the laterally outer end of each helical portion 70 is a hook portion 74 which hooks over the upper edge of the associated operating lever side flange. The initial shape of the spring 68 is such that when assembled with the latch member and operating lever in the manner shown the torque 72 urges the arms 62, 62 upwardly toward the top portion of the control lever. Through engagement of the arms 62, 62 with the control lever the spring 68 also serves to bias the control lever to its first or normal position relative to the operating lever as shown in FIGS. 3, 5 and 6. The latch member is, however, capable of pivoting counterclockwise from the position shown in these figures independently of the control lever 42.

As will be apparent from FIGS. 3 and 4, movement of the control lever from the FIG. 3 position to the FIG. 4 position serves to swing the latch member 60 clockwise about the axis of the pivot pin 48 so that the transverse part 66 is swung rearwardly and upwardly relative to the abutment 56 and out of overlapping or locked relationship with the abutment surface 58. Therefore, as the control lever is tipped upwardly or moved in such a direction as to cause opening movement of the operating lever, the latch member 60 is automatically or simultaneously released from locked relationship with the abutment 56. That is, when the parts are in the positions shown in FIG. 3, the engagement of the latch part 66 with the abutment surface 58 holds the operating lever against clockwise movement to an open position. To effect opening movement of the operating lever a lifting force is applied to the rear end of the control lever which first causes the control lever to tilt upwardly relative to the operating lever to the FIG. 4 position. At this occurs, the latch which previously held the operating lever closed is released so that by applying a continued lifting force to the control lever the operating lever will be swung clockwise from the FIG. 4 position to a forward or open position.

FIG. 5 shows the operating lever in a partly opened position. Assuming that the hook portion 30 of the yoke is engaged with the transverse pin 14 of the strike a downward force will now have to be applied to the rear end of the control lever to move the operating lever counterclockwise to its completely closed position. This depressing force applied to the rear of the control lever tends to rotate it counterclockwise relative to the operating lever and to maintain the tongue 50 in engagement with the top portion 34 of the operating lever. In order that the operating lever may be moved from the FIG. 5 position to its fully closed position without any further manipulation of the control lever, the abutment 56 is also provided with a generally downwardly and rearwardly inclined cam surface 76 which is engageable with the forward surface of the latch part 66 as shown in FIG. 6 during the closing movement of the operating lever. As the control lever and operating lever are moved counterclockwise downwardly from the position shown in FIG. 6 the inclined cam surface 76 moves the latch member 60 clockwise about the axis of the pivot pin 48 independently of the control lever to allow the part 66 to move past the protruding rear end of the abutment and back into overlapping or locking relationship with the surface 58.

It is often desirable that a catch of the type described be capable of being sealed in its closed position by means of a seal wire or strap. The catch described above is easily adapted to receive a seal strap by providing each flange 46 of the control lever with a notch such as shown at 78. The top surface of the notch 78 is on substantially the same plane as the bottom surface of the tongue 50. Each side flange 32 of the operating lever is also provided with a notch as shown at 79, having a bottom surface located in substantially the same plane as the bottom surface of the notch 78 when the control lever is in its normal attitude. The notches 78 and 79 together with the tongue 50 therefore provide a rectangular shaped opening in each side of the catch unit of appropriate size for receiving a seal strap and a stop when inserted through said opening will prevent opening of the catch without destroying or deforming the strap. For use with a seal wire, registering openings (not shown) may be formed in the side flanges of the control lever and operating lever.

Another embodiment of the invention is shown in FIGS. 8, 9 and 10. This embodiment is substantially the same as that shown in FIGS. 1 to 7 except for including a means for adjusting the pivot axis of the yoke relative to the operating lever to provide a means for varying the closing pressure exerted by the yoke on the strike and for causing the yoke to engage the strike in the desired manner. In FIGS. 8, 9 and 10 the parts which are similar to the parts shown in FIGS. 1 to 7 have been given the same reference numbers as in FIGS. 1 to 7 and will not be redescribed in detail. In the construction of FIGS. 8, 9 and 10 the pivot pin 28 instead of being fixed relative to the operating lever as in FIGS. 1 to 7 is received in elongated slots, such as shown at 81, in the operating lever side flanges. The pin 28 is therefore capable of moving longitudinally of the operating lever or toward and away from the pivot pin 22. Associated with the pivot pin 28 is an adjustment means for manually varying the position of the pivot pin relative to the operating lever and, as shown, this adjustment means comprises a first block 80 located between the side flanges 32, 32 of the operating lever and beneath the top portion 20 thereof. At its rear end the block 80 is provided with a transverse bore through which passes the pivot pin 28 for pivotally securing the block to the latter pin. Also included in the block 80 is a longitudinally extending threaded bore 82.

The threaded bore 82 of the first block receives the threaded portion 84 of a adjustment screw 86 which at its forward end has a stud portion 88 supported and axially fixed to a second block 90 fixed relative to the operating lever 20. The adjusting screw is axially fixed to the block 90 by an enlarged head 92 located adjacent the rear surface of the block and by a crowned portion 94 of the stud adjacent the forward side of the block. The head 92 is relatively large in size and knurled on its periphery so as to be easily turned by the fingers of a user. Additionally, it is located beneath the top portion of the operating lever and therefore normally out of sight. Rotation of the head 92 in the one direction of the other moves the first block 80 longitudinally of the operating lever which accordingly adjusts the pivot pin 48 toward or away from the pivot pin 22 in the desired manner. The second block 90 may be fixed to the operating lever in various different ways, but in the present instance is shown to be so fixed by means of the pivot pin 22 which passes through an upper transverse bore therein and by a second pin 96 which passes through a lower transverse bore therein. The pin 96 on either end passes through the associated side flange of the operating lever but does not pass through the base side flange 24 as does the pivot pin 22.

Figure 11:
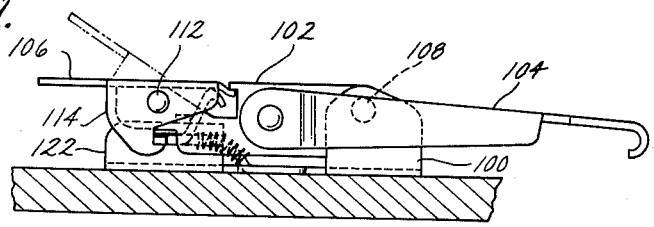
FIG. 11 is a side elevational view of a catch construction comprising another embodiment of the present invention, this view showing the catch in its closed condition.
Figure 12:
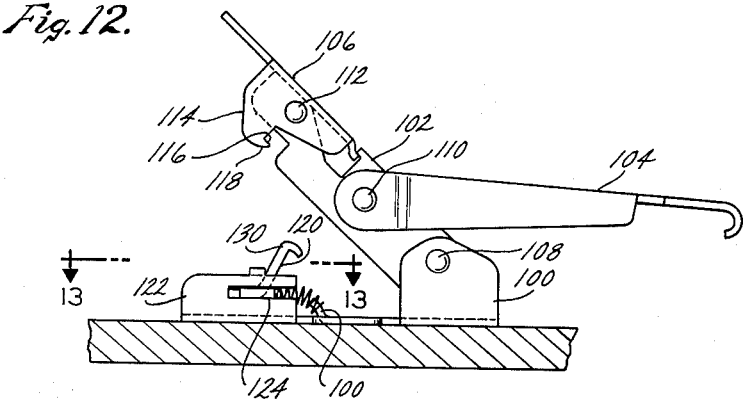
FIG. 12 is a side elevational view of FIG. 11 catch, but showing the catch in a partially open condition.
Figure 13:
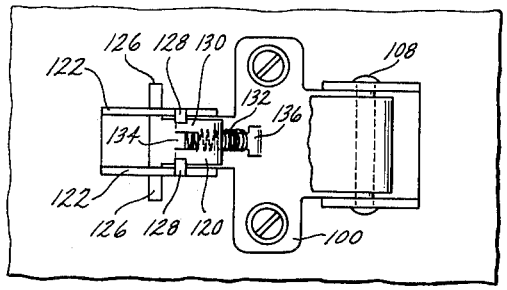
FIG. 13 is a plan view of the base of the catch of FIG. 11.

FIGS. 11, 12 and 13 show another embodiment of the present invention wherein the latch parts for holding the operating lever in its closed position are generally reversed as compared to the previously discussed embodiments insofar as the spring and a moving part of the latch are carried by the base rather than by the operating lever. Referring to these figures, the illustrated catch comprises a base 100, and operating lever 102, a yoke or hook member 104 and a control lever 106. The operating lever 102 is pivotally connected to the base 100 by a transverse pivot pin 108, the yoke or hook member 104 is pivotally connected to the operating lever by a transverse pivot pin 110, and the control lever is pivotally connected to the operating lever 102 by a transverse pivot pin 112. In general, the base 100, the operating lever 102, the yoke or hook member 104 and the control lever 106 are similar to the corresponding parts of the previously described catches and therefore are not described in detail except for their differences.

Considering first the control lever 112, this member includes two depending side flanges or ears, generally similar to the flanges 46, 46 of the FIG. 1 embodiment, and one of which is shown at 114 in FIGS. 11 and 12. At its lower forward portion, each ear 114 is shaped to define a generally upwardly facing latch surface 116 and, below the latch surface, an upwardly and forwardly inclined cam surface 118. As hereinafter described, the ears 114, 114 of the control member serve as part of the latch means for maintaining the operating lever in its closed position.

Cooperating with the ears of the control lever, is a bolt 120 supported on the base 100. As shown best in FIGS. 12 and 13, the base 100 at its rear end includes two transversely spaced upwardly extending side flanges 122, 122 each of which includes a slot 124 opening onto the forward end of the flange and extending some distance rearwardly thereof. Included in the bolt 120 are two laterally extending arms 126, 126 which are loosely received respectively in the two slots 124, 124 of the base flanges 122, 122 so as to permit the bolt to both slide longitudinally relative to the base and to pivot relative to the base about the axis of the arms 126, 126. Rearward movement of the bolt relative to the base is limited by engagement of the arms 126, 126 with the rear end of the slots 124, 124, and pivotal movement of the bolt in the counterclockwise direction as viewed in FIG. 12 is limited by two tabs 128, 128 which extend laterally inwardly toward one another from the upper edges of the side flanges 122, 122. The part 130 of the bolt which is engaged by the tabs 128, 128 is of a width substantially equal to the spacing between the two side flanges 122, 122 so that the bolt is held laterally in place by the two flanges 122, 122. This part also extends upwardly beyond the two side flanges 122, 122 to exert a biasing force on the control lever when the operating lever is in its closed position as hereinafter explained in more detail.

The bolt 120 is urged to its rearward position relative to the base 100 and to its angular position as limited by the tabs 128, 128 by a spring 132 located between the base 100 and the bolt 120. As shown, the spring 132 is a helical compression spring having one end received on a tab 134 struck from the body of the bolt 120 and having its other end received on a shouldered tab 136 struck upwardly from the base 100. From FIGS. 12 and 13 it will be apparent that the deflection of the spring is such that it normally urges the bolt 120 to the position shown in FIG. 12.

Considering the operation of the embodiment of FIGS. 11, 12 and 13, when the operating lever is in its closed position as shown in FIG. 11 the upwardly facing surfaces 116, 116 of the ears 114, 114 on the control lever 106 engage the two laterally outwardly extending arms 126, 126 of the bolt 120 to hold the operating lever in in its closed position. At this time, the part 130 of the bolt 120 also engages the undersurface of the control lever 106 and is held by the control lever slightly away from engagement with the tabs 128, 128 of the base. As a result, a bias force is transmitted from the spring 132 through the bolt to the control lever to urge the control lever to its normal or first position as shown by the solid lines of FIG. 11. When it is desired to open the catch, the control lever is moved from its first position to a second position, as shown by the broken lines of FIG. 11, relative to the operating lever to cause the latch surfaces 116, 116 of the control lever to be moved from latching relationship with the bolt arms 126, 126. By thereafter applying continued lifting force to the control lever the operating lever may therefore be swung to an open position relative to the base.

When it is desired to close the catch, a downward force is applied to the control lever to move the operating lever toward the base. As the ears 114, 114 on the control lever approach and engage the arms 126, 126 of the bolt 120, the inclined cam surfaces 118, 118 cam the bolt 120 forwardly relative to the base against the biasing force of the spring 132 to permit the ears to move into latching relationship with the bolt arms 126, 126, said bolt arms being snapped into locking engagement with the surfaces 116, 116 by the spring 132 after the surfaces 116, 116 move below the arms. At the same time, the bolt part 130 is also moved into engagement with the undersurface of the control lever so that when the manual closing force is thereafter removed from the control lever the control lever will be held in its first position by the bolt until a manual lifting force is applied to the control lever to open the catch.

The invention claimed is:

1. In a catch for releasably securing together two separable panels or the like, the combination comprising a base adapted for connection with one of said panles, an operating lever connected with said base for pivotal movement between open and closed positions relative to said base, a control lever connected with said operating lever for purely pivotal movement between first and second positions relative to said operating lever about a transverse pivotal axis fixed relative to said operating lever, a bolt supported on said base for sliding movement longitudinally thereof and for pivotal movement about an axis extending transversely of said base, a spring between said bolt and said base for urging said bolt rearwardly relative to said base toward a rearward limited portion and pivotally relative to said base toward an angularly limited position, at least one ear on said control lever, said ear having a generally upwardly facing surface engageable with said bolt to hold said operating lever in its closed position when said control lever is in its first position, said upwardly facing surface being moved out of engagement with said bolt when said control lever is moved to its second position, and a part on said bolt engageable with said control lever when said operating lever is in its closed position relative to said base to bias said control lever toward its first position, said bolt when said operating lever is in its closed position being held by said control lever away from its angularly limited position so that a bias force is transmitted from said spring to said control lever through said bolt.

2. In a catch for releasably securing together two separable panels or the like, the combination comprising a base adapted for connection with one of said panels, an operating lever connected with said base for pivotal movement between open and closed positions relative to said base, a control lever connected with said operating lever for purely pivotal movement between first and second positions relative to said operating lever about a transverse pivotal axis fixed relative to said operating lever, and a latch mechanism between said operating lever and said base for releasably holding said operating lever in its closed position, said latch mechanism including a bolt supported on said base for sliding movement longitudinally thereof, a spring between said bolt and said base for urging said bolt rearwardly relative to said base toward a rearward limited position, and a latch means connected with said operating lever for purely pivotal movement about a transverse pivotal axis fixed relative to said operating lever into and out of latching relationship with said bolt in response to such pivotal movement when said operating lever is in its closed position, said latch means including a cam surface engageable with said bolt to move said bolt forwardly during closing movement of said operating lever to permit said bolt to move into latching relationship with said latch means, and means for moving said latch means out of latching relationship with said bolt means in response to movement of said control lever from its first to its second position relative to said operating lever.

3. In a catch for releasably securing together two separable panels or the like, the combination comprising a base adapted for connection with one of said panels, an operating lever connected with said base for pivotal movement between open and closed positions relative to said base, a control lever connected with said operating lever for purely pivotal movement between first and second positions relative to said operating lever about a transverse pivotal axis fixed relative to said operating lever, and a latch mechanism between said operating lever and said base for releasably holding said operating lever in its closed position, said latch mechanism including at least one ear on said control lever, a bolt supported on said base for sliding movement longitudinally thereof, and a spring between said bolt and said base for urging said bolt rearwardly relative to said base toward a rearward limited position, said ear having a generally upwardly facing surface engageable with said bolt to hold said operating lever in its closed position and having a cam surface engageable with said bolt to move the latter forwardly during closing movement of said operating lever to permit said bolt to move into latching relationship with said upwardly facing surface of said ear, said ear being so positioned on said control lever as to be moved out of latching relationship with said bolt in response to movement of said control lever from its first to its second position relative to said operating lever.

4. A catch as defined in claim 3 further characterized by said biasing means including a part on said bolt engageable with said control lever when said operating lever is in a closed position relative to said base.

5. In a catch for releasably securing together two separable panels or the like, the combination comprising a base adapted for connecting with one of said panels, an operating lever connected with said base and having one end movable between raised and lowered positions relative to said base to respectively open and close said catch, a control lever connected with said operating lever for purely pivotal movement relative to said operating lever about a transverse pivotal axis fixed relative to said operating lever, said control lever including a manually engageable portion at said one end of said operating lever, stop means limiting said control lever to movement between first and second end limits relative to said operating lever, an abutment fixed relative to said base, a latch member connected with said operating lever for purely pivotal movement about said transverse pivot axis and having a part movable into and out of latching relationship with said abutment in response to such pivotal movement when said one end of said operating lever is in its lowered position, means for biasing said latch member toward latching relationship with said abutment, and means on said control lever for engaging said latch member and moving the latter out of latching relationship with said abutment in response to movement of said control lever relative to said operating lever in the direction resulting from a manual force applied to said manually engageable portion thereof in the same general direction as the force required to move said one end of said operating lever to its raised position, said stop means being so arranged that said control lever reaches one of said end limits of its movement shortly after said latch member is moved out of latching relationship with said abutment with the result that the manual force applied thereto is thereafter transferred to said operating lever to tend to raise said one end thereof.

6. In a catch for releasably securing together two separable panels or the like, the combination comprising a base adapted for connection with one of said panels, an operating lever connected with said base and having one end movable between raised and lowered positions relative to said base to respectively open and close said catch, a control lever connected with said one end of said operating lever for purely pivotal movement relative to said operating lever about a transverse pivotal axis fixed relative to said operating lever and including a manually engageable portion located outboard of said pivot axis so that a lifting force applied to said manually engageable control lever portion has substantially the same direction as a lifting force applied to said operating lever, stop means for limiting said control lever to movement between first and second limit positions relative to said operating lever, an abutment fixed relative to said base and including a surface facing in a direction generally opposite to the direction of movement of said operating lever as said one end thereof moves from its lowered to its raised position, a latch member separated from said control lever and connected with said operating lever for purely pivotal movement about said transverse pivot axis and having a part which is swung into and out of overlapped relationship with said abutment surface in response to such pivotal movement when said one end of said operating lever is in its lowered position, said latch member part when in overlapped relationship with said abutment surface being engageable with the latter to prevent movement of said one end of said operating lever to its raised position, means for biasing said latch member toward said overlapped relationship with said abutment surface, and means on said control lever for engaging said latch member, and moving the latter of overlapped relationship with said abutment surface to free said operating lever for movement of said one end thereof to its raised position in response to movement of said control lever relative to said operating lever in the direction resulting from a manual lifting force applied to said manually engageable portion of said control lever, said stop means being so arranged that said control lever reaches said second limit position shortly after said latch member is moved out of overlapped relationship with said abutment surface with the result that the manual lifting force applied to said manually engageable portion of said control lever is thereafter transferred to said one end of said operating lever to tend to move the latter to its raised position.

7. The combination as defined in claim 6 further characterized by cooperating surfaces on said abutment and on said latch member for camming said latch member in a direction opposite to force of said biasing means to allow said latch member part to move into overlapped relationship with said abutment surface as said one end of said operating lever is moved to its lowered position and while said control lever remains in its first limit position with the result that said one end of said operating lever may be moved from its raised to its lowered position and latched in the latter position solely by the application of a manual lowering force to said manually engageable portion of said control lever.

8. The combination as defined in claim 7 further characterized by a strike adapted for connection with the other of said panels, means connecting said operating lever to said base for pivotal movement relative to said base about a second transverse axis fixed relative to said base, a member connected with said operating lever and having a part which is engageable with said strike to exert a closing pressure thereon when said one end of said operating lever is in its lowered position, and adjustment means for manually varying the spacing which exists between said strike engageable part and said second transverse axis when said one end of said operating lever is in its lowered position and said strike engageable part is in engagement with said strike.

9. The combination defined in claim 8 further characterized by means pivotally connecting said member to said operating lever for pivotal movement relative to said operating lever about a third transverse axis, and said adjustment means includes a first block fixed relative to said operating lever, a second block fixed relative to said third transverse pivot axis and supported for sliding movement longitudinally of said operating lever, an adjustment screw rotatably supported by and axially fixed relative to one of said blocks and threadably received by the other of said blocks for moving said blocks toward or away from each other in response to rotation of said screw, said screw including an enlarged head adapted to be turned by the fingers and thumb of a user.

10. In a catch for releasably securing together two separable panels or the like, the combination comprising a base adapted for connection with one of said panels, an operating lever connected at its forward end with said base for pivotal movement between open and closed positions relative to said base, a control lever on the rear end of said operating lever, a transverse pivot pin pivotally connecting said control lever to said operating lever, said control lever having a manually engageable portion extending rearwardly from said pivot pin and from said operating lever, stop means for limiting said control lever to movement between first and second limit positions relative to said operating lever, said manually engageable portion of said control lever during movement of said control lever from said first limit position to said second limit position moving in substantially the same direction as does said rear end of said operating lever during movement of said operating lever from its closed to its open position, an abutment fixed relative to said base and including a surface facing in a direction generally opposite to the direction of movement of said rear end of said operating lever during movement of said operating lever from its closed to its open position, a latch member received on said transverse pivot pin for purely pivotal movement about the axis thereof and having a part which is swung into and out of overlapped relationship with said abutment surface in response to such pivotal movement when said operating lever is in its closed position, said latch member part when in overlapped relationship with said abutment surface being engageable with the latter to prevent movement of said operating lever to its open position, means for biasing said latch member toward said overlapped relationship with said abutment surface and said control lever toward its first position, and means on said control lever engageable with said latch member to move the latter out of overlapped relationship with said abutment surface to free said operating lever for movement to its open position in response to movement of said control lever from its first toward its second position and before it reaches said second position so that after said second position is reached further movement of said manually engageable part in the same general direction causes movement of said operating lever toward its open position.

11. In a catch for releasably securing together two separable panels or the like, the combination comprising a base adapted for connection with one of said panels, an operating lever connected at its forward end with said base for pivotal movement between open and closed positions relative to said base and which operating lever includes two laterally spaced side flanges, a control lever on the rear end of said operating lever and including two laterally spaced side flanges each disposed adjacent respective one of said operating lever side flanges to form two transversely spaced pairs of side flanges, a transverse pivot pin extending through said operating lever side flanges and said control lever side flanges for pivotally connecting said control lever to said operating lever, said control lever having a manually engageable portion located between its side flanges and extending rearwardly from said pivot pin and from the rear end of said operating lever, stop means for limiting said control lever to movement between first and second limit positions relative to said operating lever, said manually engageable portion of said control lever during movement of said control lever from said first limit position to said second limit position moving in substantially the same direction as does said rear end of said operating lever during movement of said operating lever from its closed to its open position, an abutment fixed relative to said base and including a surface facing in a direction generally opposite to the direction of movement of said rear end of said operating lever during movement of said operating lever from its closed to its open position, said abutment being located between said two pairs of side flanges, a latch member located between said two pairs of side flanges and having two wings disposed on opposite sides of said abutment, said wings being received on said transverse pivot pin for purely pivotal movement of said latch member about the axis thereof and said latch member having a part extending lateraly between said wings which part is swung into and out of overlapped relationship with said abutment surface in response to such pivotal movement when said operating lever is in its closed position, said latch member part when in overlapped relationship with said abutment surface being engageable with the latter to prevent movement of said operating lever to its open position, means for biasing said latch member toward said overlapped relattionship with said abutment surface and said control lever toward its first position, and means on said control lever engageable with said wings to rotate said latch member about the axis of said pivot pin and to thereby move said part thereof out of overlapped relationship with said abutment surface to free said operating lever for movement to its open position in response to movement of said control lever from its first to its second position and before it reaches said second position so that after said second position is reached further movement of said manually engageable part in the same general direction causes movement of said operating lever toward its open position.

12. The combination defined in claim 11 further characterized by said latch member being so constructed and arranged that said part thereof moves generally rearwardly and upwardly relative to said operating lever when moving out of overlapped relationship with said abutment surface, and said abutment having a rearwardly and downwardly inclined cam surface engageable with said latch member part as said operating lever is moved from its open position to its closed position for moving said latch member rearwardly and upwardly relative to said operating lever to return said part to overlapped relattionship with said abutment surface while said control lever remains in said first position so that when said operating lever is in its open position it may be moved to and latched in its closed position solely by a manual force applied to said manually engageable part of said control lever in the direction to urge said control lever toward its first position.

13. In a catch for releasably securing together two separable panels or the like, the combination comprising a base adapted for connection with one of said panels, an operating lever connected at its forward end with said base for pivotal movement between open and closed positions relative to said base and which operating lever includes two laterally spaced side flanges, a control lever on the rear end of said operating lever and including a top portion spaced from said base and two laterally spaced side flanges each of which extends downwardly from said top portion toward said base and is disposed adjacent a respective one of said operating lever side flanges to form two transversely spaced pairs of side flanges, a transverse pivot pin located below said control lever top portion and extending through said operating lever side flanges and said control lever side flanges for pivotally connecting said control lever to said operating lever, said top portion of said control lever extending both forwardly and rearwardly of said pivot pin, stop means for limiting said control lever to movement between first and second limit positions relative to said operating lever, the rearwardly extending portion of said control lever top portion during movement of said control lever from said first limit position to said second limit position moving in substantially the same direction as does said rear end of said operating lever during movement of said operating lever from its closed to its open position, an abutment fixed relative to said base and having a generally downwardly facing surface, said abutment being located between said two pairs of side flanges, a latch member located between said two pairs of side flanges and having two wings disposed on opposite sides of said abutment each of which wings is received on said transverse pivot pin for purely pivotal movement about the axis thereof and includes one arm extending generally forwardly of said pivot pin and another arm extending generally downwardly of said pivot pin, and means for biasing said latch member in such a direction about the axis of said pivot pin as to urge said forwardly extending arms toward engagement with the undersurface of said top portion of said control lever and to thereby also urge said control lever toward its first limit position, said latch member also including a part which extends laterally between said downwardly extending arms which part is positioned beneath said abutment surface to hold said operating lever in its closed position when said control lever is in its first position and which part is swung free of said abutment surface in response to pivotal movement of said control lever to its second position as a result of pivotal movement of said latch member effected by engagement of said top portion of said control lever with said forwardly extending arms.

14. In a catch for releasably securing together two separable panels or the like, the combination comprising a base adapted for connection with one of said panels, an operating lever connected with said base and having one end movable between raised and lowered positions relative to said base to respectively open and close said catch, a control lever connected with said operating lever for purely pivotal movement relative to said operating lever about a transverse pivotal axis fixed relative to said operating lever, said control lever including a manually engageable portion at said one end of said operating lever, stop means limiting said control lever to movement between first and second end limits relative to said operating lever, and a latch mechanism between said operating lever and said base for releasably holding said operating lever in its closed position, said latch mechanism including an abutment means carried by one of the set of two parts comprising said operating lever and said base, a latch means connected with the other part of said set of two parts for purely pivotal movement about a transverse pivotal axis fixed relative to said other part and into and out of latching relationship with said abutment means in response to such pivotal movement occurring when said one end of said operating lever is in its lowered position, means for biasing said latch means toward latching relationship with said abutment means, and means for moving said latch means out of latching relationship with said abutment means in response to movement of said control lever relative to said operating lever in the direction resulting from a manual force applied thereto in the same general direction as the force required to move said one end of said operating lever to its raised position, said stop means being so arranged that said control lever reaches one of said end limits of its movement relative to said operating lever shortly after said latch means is moved out of latching relationship with said abutment means so that the manual force applied thereto is thereafter transferred to said operating lever to tend to raise said one end thereof.

15. A catch as defined in claim 14 further characterized by said abutment means having a generally downwardly facing surface, and said latch means comprising at least one ear on said control lever, said ear having a generally upwardly facing surface engageable with said downwardly facing surface of said abutment means to hold said one end of said operating lever in its lowered position.

16. In a catch for releasably securing together two separable panels or the like, the combination comprising a base adapted for connection with one of said panels, an operating lever connected with said base and having one end movable between raised and lowered positions relative to said base to respectively open and close said catch, a control lever connected with said one end of said operating lever for purely pivotal movement relative to said operating lever about a transverse pivot axis fixed relative to said operating lever and including a manually engageable portion located outboard of said pivot axis so that a lifting force applied to said manually engageable control lever portion has substantially the same direction as a lifting force applied to said operating lever, stop means for limiting said control lever to movement between first and second limit position relative to said operating lever, and a latch mechanism between said operating lever and said space for releasably holding said one end of said operating lever in its lowered position, said latch mechanism including an abutment means carried by one of the set of two parts comprising an operating lever and said base, a latch means connected with the other part of said set of two parts for purely pivotal movement about a transverse pivotal axis fixed relative to said other part and into and out of latching relationship with said abutment means in response to such pivotal movement occurring when said one end of said operating lever is in its lowered position, means for biasing said latch means toward latching relationship with said abutment means, and means on said control lever for moving said latch means out of latching relationship with said abutment means to free said operating lever for movement of said one end thereof to its raised position in response to movement of said control lever relative to said operating lever in the direction resulting from a manual lifting force applied to said manually engageable portion of said control lever, said stop means being so arranged that said control lever reaches said second limit position shortly after said latch means is moved out of latching relationship with said abutment means with the result that a manual lifting force applied to said manually engageable portion of said control lever is thereafter transferred to said one end of said operating lever to tend to move the latter to its raised position.

References Cited by the Examiner
UNITED STATES PATENTS

| | | |
|---|---|---|
| 2,732,238 | 1/1956 | Dornberg. |
| 2,869,200 | 1/1959 | Phillips et al. |
| 3,070,396 | 12/1962 | Swanson _____ 292—247 |

JOSEPH D. SEERS, *Primary Examiner.*

M. HENSON WOOD, JR., *Examiner.*